Oct. 28, 1952         J. A. TALALAY         2,615,202
MOLD FOR RUBBER PRODUCTS AND ARTICLE FORMED THEREIN
Filed May 31, 1949         2 SHEETS—SHEET 2
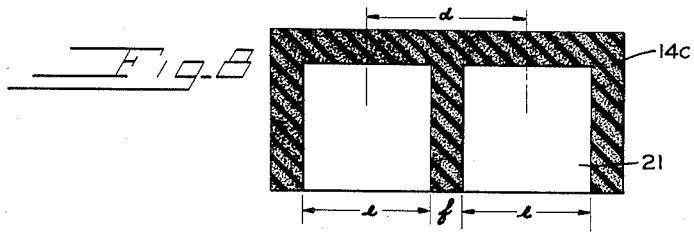
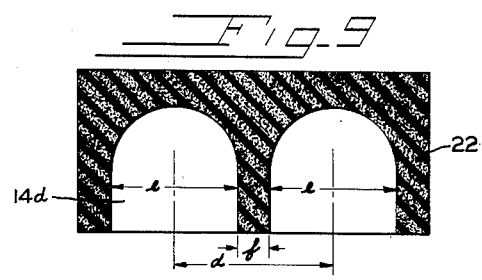
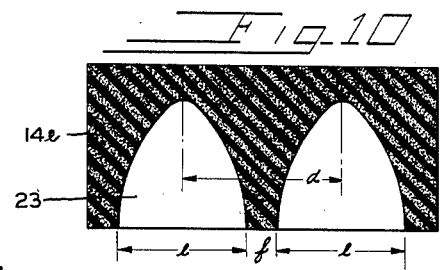
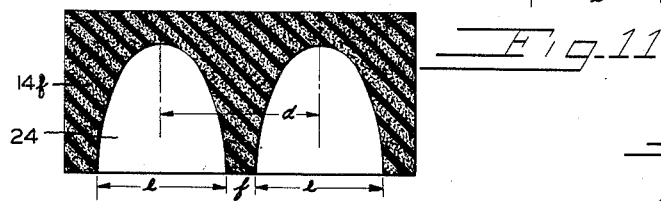
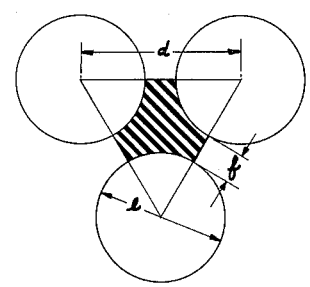
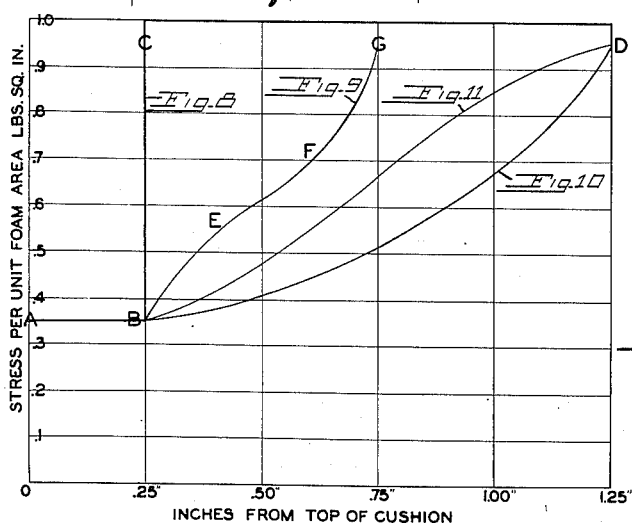
*INVENTOR.*
JOSEPH ANTON TALALAY
BY *Clarence B. Desjardins*
HIS ATTORNEY Patented Oct. 28, 1952

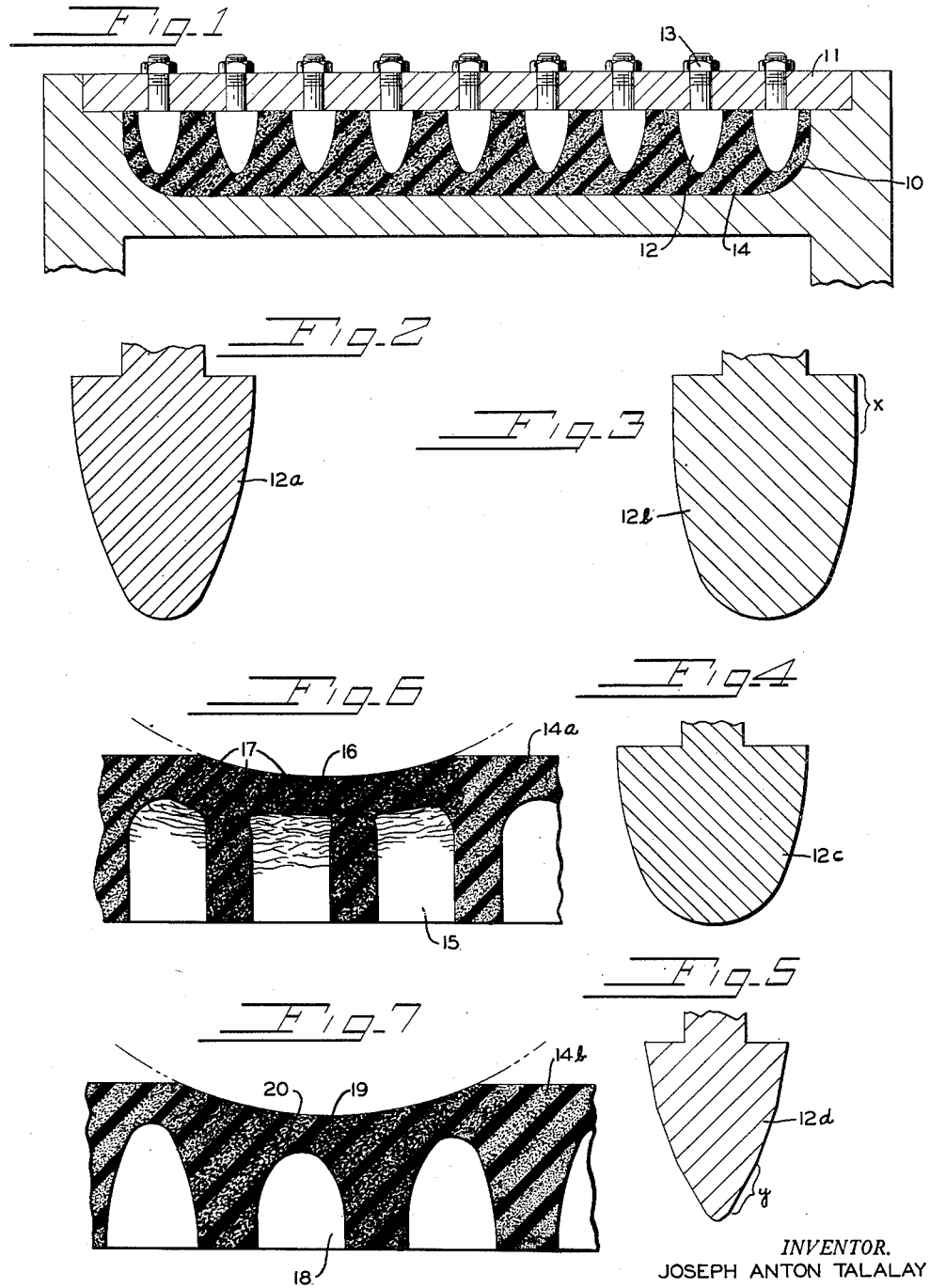

2,615,202

UNITED STATES PATENT OFFICE 2,615,202

MOLD FOR RUBBER PRODUCTS AND ARTICLE FORMED THEREIN

Joseph Anton Talalay, New Haven, Conn., assignor, by direct and mesne assignments, of one-half to The Sponge Rubber Products Company, a corporation of Connecticut, and one-half to The Dayton Rubber Company, Dayton, Ohio, a corporation of Ohio Application May 31, 1949, Serial No. 96,355

13 Claims. (Cl. 18—39)

1

The present invention relates to molds for rubber products and more particularly to molds in which foamed rubber latex may be shaped, coagulated and/or vulcanized to form products having a desired structure and configuration. This invention relates further to sponge rubber products of the foamed latex type having elongated cavities or cored portions formed therein and produced in the molds of the present invention.

The molds of the present invention are generally utilized in the manufacture of seat cushions, mattresses and the like. These products may be formed by introducing into a mold a frothed or foamed latex composition, coagulating the foam and then vulcanizing before removing the product from the mold. The foam may also be formed within the mold and coagulation effected either by use of a delayed action coagulant as shown by United States Patent No. 1,852,447, or by freezing followed by coagulation as shown by Talalay Patent No. 2,432,353.

Foamed latex products of the type described which have any substantial thickness are usually made with cavities or cored portions extending transversely of the longitudinal axis of the material, these cavities being generally uniformly spaced and distributed through the product, and extending partially through the foam rubber so that an uncored surface section is provided which forms the region to which body pressure or the like is applied. The provision of these cavities is desirable to reduce the weight of the product and at the same time permit a saving in material thereby reducing cost. A further and even more important reason is to permit better heat transfer during manufacture, in the vulcanization and/or freezing steps which are utilized in the process.

In the formation of these products, two-part sectional molds are most often used with cores or projections usually known as "pins" extending interiorly from the surface of one part or portion of the mold and none from the other part or portion where a continuous uncored surface is desired. The cavities are usually formed in the base portion or bottom of the product. The use of these projections substantially increases the surface of one portion of the mold and makes the product more difficult to strip after vulcanization due to adherence of the spongy material. Furthermore, by the use of conventional molds with conventional core structures or projections

2 mounted therein, cavities are formed which result in uneven distribution of stresses within the product when under load. The resultant localized points of strain within the interior of the material cause eventual disruption of cell structures and non-uniform resiliency accompanied by more rapid wear and deterioration, particularly through repeated flexing which the cushions have to endure in use.

It is an object of the present invention to provide a novel mold construction for the manufacture of sponge rubber articles of the foamed latex type. It is a further object of the present invention to provide such a mold construction having cores or projections therein designed to facilitate removal of the molded object and to form cavities therein permitting more uniform and gradual distribution of loads and stresses. It is an additional object of the present invention to provide a novel molded sponge rubber product of the foamed latex type having cavities therein so formed as to permit a more gradual distribution of load and compression in the body of the cushion with resultant greater durability.

In accordance with the present invention, it has been found that if the molds are constructed with pins having a generally paraboloidal or semi-ellipsoidal configuration with the length greater than the width and with the curved portion extending at least the major portion of the distance to the base of the pin, more uniform and gradual distribution of the loads and stresses interiorly of the product will be obtained and more ready stripping from the mold permitted. Although paraboloidal or semi-ellipsoidal curvatures are preferred, forms approaching these may be utilized and pins having a gradually decreasing slope from the base to the apex over a major portion of the surface of the pin, where the length of the pin is greater than the width, will accomplish the desired purposes. The slope is defined as the acute angle between a line tangent to the curve and what has been referred to above as the longitudinal axis of the material. In general, the shape of the pin, or at least the major portion thereof, is in the form of a segment of a prolate spheroid tapering gradually from a base of less diameter than the length of the pin.

The reason for the unexpected advantages arising from the use of pins having the curvature described may be ascribed principally to certain factors discussed below. Conventional pins which are essentially cylindrical in form and which may have either flat or rounded top portions, form cavities in the final product having the same structure. In the case of a seat cushion or mattress in which the cavities extend inwardly from the base, when a load is applied to the top surface, the force is concentrated vertically along lines defining the diameter of the cylinder, but where the cavity is of a gradually curving construction as defined herein, the forces are distributed along a series of lines defining the progressively increasing diameter of the cavity from apex to base. As a result the stresses are subdivided and the load is not concentrated along any particular point or line in the vertical direction. One result of this is to give added cushioning effect since advantage is taken of the arch or buttress structure which has better load carrying properties.

Furthermore, in the case of conventional pins, the concentration of load along the diameter of the cylinder causes severe deformation of the walls of the cavity and after repeated flexings the cell structure in that region may be destroyed. In addition, where a sharp corner exists in the cavity as at the junction of the top with the vertical side walls, stresses appear to be concentrated resulting in eventual tearing at that point.

The ease of stripping bears a direct relationship to the nature and extent of the sloping surface of the pin. During the molding operation, a certain amount of contraction of the foam will tend to occur. Even if this contraction is slight, the tendency where conventional pins are used, is for the spongy rubber to contract around the pins and thus promote adhesion to the pins and resist stripping. In the case of a cylindrical pin, the forces of contraction are all exerted at right angles to the walls of the pin, and hence increase the tendency toward frictional adherence between the molded product of the pin and make stripping of the product from the mold more difficult. When a pin is used that has a gradually sloping surface along the major portion of the distance between its apex and base, the forces of contraction are normal to the sloping surface, or to the tangent to a curved surface, at any given point, and are resolved into two components, one tending to move the product lengthwise of the pin and assisting stripping, and the other at right angles to the axis of the pin. Thus, not all of the contracting forces are effective to increase the frictional grip of the product on the pin, and part of them actually help the stripping action. While a conical pin would favorably promote this action, such a pin having a slope sufficient to be fully effective would require a base diameter which would occupy too great a portion of the base area of the product if a suitable number of pins is to be used. Furthermore, if narrow conical pins are used the slope of which more nearly approaches a vertical axis, these would not permit the removal of sufficient material to reduce the weight of the product to the desired extent. In addition, the conical structure at the apex of the pin would not give the desired arch or buttress, and the peak of the cone would provide a sharply angled point at which excessive strain might occur. For these reasons, pins having the curved surfaces described herein have been found to be most suitable.

The weight, and hence the rubber content, of a foam cushion of the cored type, is dependent upon the number, size, and spacing of the cavities and the thickness of the top layer above the apices of the cavities. It is also dependent upon the density of the foam. Since the weight of the product is to a certain extent dependent upon the thickness of the top layer, it stands to reason that the thinner this layer the lighter the resulting cushion construction irrespective of all other considerations. The weight advantage of a thinner top layer cannot, however, be realized with the conventional flat or semi-spherical top pins, because the cavities begin to "show" through the thin top layer giving an uneven appearance to the top surface. In fact the location of the cavities shows through the surface like the spine on an underfed cat. This disadvantage is substantially avoided when using paraboloidal or ellipsoidal pins to form the cavities in accordance with the present invention. By such use the thickness of the top layer can be reduced even to below 0.25" without marring the top surface in the least. To give a practical example, a square foam cushion measuring $16\frac{1}{2}$" x $16\frac{1}{2}$" x $1\frac{1}{4}$" in thickness, having 188 1-inch diameter pins, the pins having a semi-spherical top and being arranged on $1\frac{3}{16}$" centers, will give a compression (hardness) of 17 lb. per 50 sq. in., and will have a weight of 0.838 lb. if the thickness of the top sheet is 0.25". (Compression or hardness is defined as the load or weight required, to produce a 25% indentation in a sample having an area of at least 50 sq. in., and using a flat circular indentor foot having an area of 50 sq. in.) The same cushion, with the identical outside measurements and the identical pin layout will have to weigh .935 lb. for the same compression if the top layer is increased to 0.5". Therefore, for the same load carrying capacity, the cushion with the heavier top layer (0.5") will weigh 11.5% more than the cushion with the top layer of 0.25".

The spacing between the pins is also an important factor in saving weight. If, for instance, in the square cushion described above, the number of pins is reduced and the pins are spaced more sparsely, or in other words if the distance between the peripheries of the pins should be increased from $\frac{3}{16}$" to say $\frac{5}{8}$", the weight of the cushion for the same load carrying capacity of 17 lb. per 50 sq. in. would increase by about 15.8%. Hence, it is advantageous to space the pins as closely as possible in the pin pattern. Here again we run into practical difficulties in attempting to space conventional cylindrical pins as closely as $\frac{1}{4}$" or $\frac{3}{16}$" apart, especially when the depth of the cushion becomes greater. This is primarily due to the fact that by decreasing the spacing and thereby increasing the number of pins, the difficulty of stripping is materially increased and the cross spacing of pins is precluded as a practical matter. By using pins having the configuration described in the present invention, this difficulty is eliminated since the stripping of the foam from the pin portion of the mold is so facilitated that small pin spacings become practical.

The following table will illustrate the savings in weight which may be obtained solely through the use of paraboloidal or ellipsoidal pins as compared with the use of pins having cylindrical construction with a semi-spherical top. In this table the cushions represented all have a load carrying capacity of 17 lbs. per 50 square inches. All the pins have a base of maximum diameter of 1" and a base spacing between pins of $\frac{3}{16}$". The overall volume of the finished cushion (including the space taken up by the cavities) is 305.2 cubic inches.

Table

| Cushion No. | Type of Pins | Total Thickness of Cushion | No. of Pins | Distance Between Pins | Thickness of Top Layer | Weight of Cushion to give Compression Hardness of 17#/50 in.² |
|---|---|---|---|---|---|---|
| | | | | Inches | Inches | |
| 1 | Cylindrical (with semi-spherical top). | 1.25 | 188 | 3/16 | .50 | .935 |
| 2 | Paraboloidal | 1.25 | 188 | 3/16 | .50 | .835 |
| 3 | Ellipsoidal | 1.25 | 188 | 3/16 | .25 | .835 |
| 4 | Paraboloidal | 1.25 | 188 | 3/16 | .25 | .807 |
| 5 | Cylindrical (with simi-spherical top). | 1.25 | 188 | 3/16 | .25 | .837 |

Note: Cushion No. 5 gave an unsatisfactory product due to the fact that the top layers above the cavities tended to collapse or dish, outlining the core structure. This shape of cavity would be undesirable in practice with a thin top layer, due to its poor appearance and the weakness of the top structure. Cushions Nos. 1 and 5 gave considerably more trouble during stripping from the molds and required greater care to avoid tearing.

The above comparison shows that by using paraboloidal or ellipsoidal pins, all other factors remaining the same, a saving in weight is effected while obtaining a cushion having the same compression. Cushion No. 4, for example, using paraboloidal pins by comparison with a cushion of the same construction using cylindrical-semispherical pins gives a weight savings of 13.7%.

This invention will be further understood by reference to the accompanying drawings in which:

Fig. 1 is a cross sectional view of a two-part seat cushion mold embodying the invention filled with foam type sponge rubber.

Figs. 2–5 inclusive illustrate in cross-section several different forms of the novel pin construction.

Fig. 6 shows a vertical cross section through a portion of a molded cushion of the prior art under load to illustrate distribution of stresses.

Fig. 7 shows a vertical cross section through a portion of a molded cushion of the present invention under load, illustrating the distribution of stresses therein.

Figs. 8 and 9 illustrate vertical cross sections through portions of molded cushions or the like having cavities of conventional design such as are described in the prior art.

Figs. 10 and 11 illustrate vertical cross sections through portions of molded cushions or the like having cavities of the paraboloidal and elliposidal type respectively, in accordance with the present invention.

Fig. 12 illustrates diagrammatically the spacing of the cavities as viewed from the bottom of the cushion formed using staggered pins in the mold.

Fig. 13 is a graphical comparison of the stress per unit area plotted against the thickness of a cushion or the like measured from the top surface thereof, corresponding to the constructions illustrated in Figs. 8 to 11 inclusive.

Referring to Fig. 1, 10 is a bottom mold section supported on a frame or the like, while 11 represents the upper mold section. In the embodiment shown the mold cavity is formed in the bottom section while the upper member serves to close the cavity and support the mold pins 12. These pins are designed to form openings extending vertically from the base of the molded product and are mounted upon the upper section in the number and spacing required. The pins may be formed with studs 13 integral therewith and fastened by means of nuts to mold plate 11. If desired, the pins may be formed with a tapped opening in the base of each and screwed onto threaded studs mounted through the upper section. As shown the mold is filled with a sponge rubber composition 14 to form a seat cushion or the like.

Figs. 2 to 5 represent longitudinal cross sections of different forms of the mold pin. Fig. 2 shows a mold pin 12a having a paraboloidal form, while Fig. 4 shows a mold pin 12c having a semi-ellipsoidal form. Fig. 3 illustrates a form of the invention in which the pin 12b has a semi-ellipsoidal form extending for a major portion of the length of the pin and having a minor portion of the distance from the base, as shown at x, terminating in a straight-sided or cylindrical segment. The major portion of the pin may, of course, be paraboloidal rather than ellipsoidal in structure. Fig. 5 shows a modified form of pin 12d having a conformation corresponding substantially to that of a paraboloid except that this conformation is obtained by means of a series of frusta of cones, as shown at y, having straight-sided walls with each successive increment tapering gradually from the base and in effect differentiating the curve. The slopes of said frusta decrease successively toward the apex.

Figs. 6 and 7 illustrate a comparison between molded products of the present invention as described in Fig. 7 and the prior art as illustrated in Fig. 6, while under load. The vertical cross-sections of a typical seat cushion structure are shown. In Fig. 6 a sponge rubber seat cushion 14a is formed with a number of cored portions 15 having the conventional straight-walled structure with a semi-spherical dome portion. When the cushion is compressed as shown at 16 the resulting stresses transmitted through the sponge material are concentrated at points 17 causing wrinkling and distortion at these points. Constant repetition of these effects will ultimately result in disruption or weakening of the cell structure in these regions with ultimate loss in resiliency and load carrying capacity. On the other hand, in the case of cushion 14b shown in Fig. 7 which contains cavities 18 having the conformation obtained by the use of pins of the type described in Figs. 2 to 5, the stresses are evenly distributed along the arch as shown at 20 and concentration at any particular point or points is avoided. This results in greater uniformity of load distribution, improved resiliency and longer life.

Fig. 8 shows in cross section a portion of a cushion or the like in which the cavities have been formed by the use of flat topped cylindrical pins 21. The foam rubber portion of the cushion is shown as 14c. In Fig. 9 a vertical cross section of a portion of a conventional seat cushion or the like is shown, formed with cylindrical pins having semi-spherical top portions 22. The foam rubber portion is shown at 14d.

Fig. 10 illustrates in cross section a portion of a seat cushion or the like having cavities 23 formed in accordance with the present invention by the use of paraboloidal pins. The foam rubber composition surrounding the cavities is shown at 14e. Fig. 11 describes in vertical cross section a portion of a seat cushion or the like having cavities 24 formed in accordance with the present invention by the use of pins having a semi-ellipsoidal structure. The surrounding foam rubber composition is shown at 14f.

Fig. 12 illustrates diagrammatically the manner in which the pins are spaced as viewed along the base of the cushion. The distance between centers of the cavities is represented by $d$, the diameter at the base is shown by $e$, and the distance between pins is shown by $f$. The pins used and the forms shown in Fig. 8–11 inclusive have the same base diameters and spacing.

The comparison between the properties of cushion or other products obtained in accordance with the present invention, as contrasted to those of the prior art, is graphically illustrated in Fig. 13. In that figure the stress per unit of foam area in pounds per square inch is plotted against the thickness of the cushion at the point where the stress occurs in inches from the top surface of the cushion. In this figure curves have been drawn illustrating the stress as applied to cushions formed in accordance with the types of construction shown in Figs. 8 to 11 inclusive. The curve corresponding to each figure has been so indicated. The construction of the cushions described is as follows:

The type of cushion shown in the curve based on Fig. 8 has a total thickness of 1.25", number of pins 188, distance between pins $\frac{3}{16}$", thickness of top layer .5". The construction upon which the curve of Fig. 9 is based corresponds to cushion No. 1 in the above table. The construction upon which Fig. 10 is based corresponds to cushion No. 2 in the above table, while that of Fig. 11 corresponds to cushion No. 3 in the table.

Referring to the graph, in using a cylindrical pin construction having a flat top such as illustrated in Fig. 8, the stress curve is defined by line A—B—C—D. The stress curve having a construction corresponding to Fig. 9 is shown by curve A—E—G—D. The curves represented by A—B—D define the stress distribution for cushions having the structure shown in Figs. 10 and 11 as indicated. As the graph indicates, the stress is uniform in the four constructions illustrated, along line A—B which corresponds to the top layer of ¼". At this point, as the top of the cylindrical pin illustrated in Fig. 8 is reached, the stress increases abruptly from the point B to the point C and remains constant from the point C to the point D. This represents the abrupt concentration of force in a vertical direction down the side of the cavity. In the case of the cylindrical pins with the semi-spherical top as illustrated in Fig. 9, the transition is somewhat more gradual. Here again there is a uniform stress through the top ¼" and the stress increases in a non-uniform manner along the line B—E—F—G and then remains constant from the point G to the point D. This transition corresponds to the point at which the curvature of the top portion of the cavity terminates. In the case of the two curves shown along the line A—B—D, there is a gradual increase in stress from the point B to D. The curve corresponding to Fig. 11 represents the most gradual distribution of stresses, this curve corresponding to the paraboloidal construction. The more favorable distribution of load obtained with the use of pins of the type described in accordance with the present invention, is readily apparent from this graph. There is no abrupt increase in the load per unit area such as is obtained with the curves of Fig. 8 and Fig. 9.

It is generally preferable to make the pins with a uniform curvature over the curved portion, that is either substantially paraboloidal or substantially ellipsoidal, as described above. In some cases, however, it may also be desirable to make the pins with a composite curvature, that is with the apex portion having one type of curvature and the body portion with the other curvature.

It is apparent from the foregoing data that substantial savings in weight may be obtained through the use of core pins of the type described herein for a given compression resistance and cushion thickness. At the same time thinner cushioning layers over the top of the cavities may be utilized without affecting either the appearance or the performance of the products. Furthermore, the more uniform distribution of load will avoid disruption of all structure and give better performance and longer life. The greatly improved stripping characteristics save time in manufacture and minimizes waste due to tearing. In addition, a larger number of cores for a given area may be utilized without unduly increasing the stripping problem as would be the case with conventional type pins.

While the foregoing description has referred specifically to the manufacture of foam type sponge rubber, the invention may also be practiced in connection with the manufacture of other molded products where the use of pins is desired and where the products must be stripped from the mold. More particularly, chemically blown sponge and mixtures of foamed latex with fibrous reinforcements may also be successfully molded in the manner described.

Although certain preferred embodiments have been illustrated herein, it is to be understood that other modifications may be resorted to without departing from the spirit of the invention or the scope of the appended claims.

I claim:

1. A mold comprising a pair of separable mold sections defining a cavity for forming shaped articles therein, and a plurality of pins affixed to at least one of said mold sections extending into said cavity, each of said pins having the major portion thereof conforming essentially to a spheroidal segment with a gradually increasing cross section from the apex of the pin along the major portion of the distance between the apex of the pin and the base thereof, said spheroidal segment defining a surface having a progressively decreasing slope from the base of the segment to the apex of the pin.

2. A mold comprising a pair of separable mold sections defining a cavity for forming a shaped article therein, and a plurality of pins affixed to at least one of said mold sections to provide molding portions extending into said cavity, each of the molding portions of said pins having a length greater than its width and having a major portion thereof conforming essentially to a paraboloid.

3. A mold comprising a pair of separable mold sections defining a cavity for forming a shaped article therein, and a plurality of pins affixed to at least one of said mold sections to provide molding portions extending into said cavity, each of the molding portions of said pins having a length greater than its width and having a major portion thereof conforming essentially to a semi-ellipsoid.

4. A two-part separable mold having a base section and a top section defining a mold cavity, a plurality of mold pins affixed to said top section extending into the mold cavity transversely of the longitudinal axis thereof, each of said pins having the major portion thereof conforming essentially to a spheroidal segment with a gradually increasing cross section from the apex of the pin along a major portion of the distance between the apex of the pin and the base thereof, said spheroidal segment defining a surface having a progressively decreasing slope from the base of the segment to the apex of the pin.

5. A mold according to claim 4 wherein the segment is a paraboloid.

6. A mold according to claim 4 wherein the segment is a semi-ellipsoid.

7. A mold comprising a pair of separable mold sections defining a mold cavity for the shaping of foamed latex type sponge rubber by the introduction of latex foam therein followed by coagulation and vulcanization before removal from the mold, and a plurality of pins affixed to one of said mold sections and extending into said cavity, each of said pins being symmetrical about its axis which extends normal to said mold section and having a length from base to apex greater than the base diameter, and each of said pins having the major portion thereof conforming essentially to a spheroidal segment with a gradually increasing cross section from the apex of the pin along the major portion of the distance between the apex of the pin and the base thereof, said spheroidal segment defining a surface having a progressively decreasing slope from the base of the segment to the apex of the pin.

8. A mold according to claim 7 wherein the spheroidal segment has a substantially paraboloidal configuration.

9. A mold according to claim 7 wherein the spheroidal segment has a substantially semi-ellipsoidal configuration.

10. A molded, foamed latex rubber article having a plurality of shaped openings therein extending from the base thereof transversely of its longitudinal axis and terminating short of the top surface thereof, each of said openings having a depth greater than its width, the major portion of said openings extending to the apex conforming essentially in configuration to a spheroidal segment with a gradually increasing cross section from the apex of the opening along a major portion of the distance between the apex of the opening and the base thereof, said spheroidal segment defining a surface having a progressively decreasing slope from the base of the segment to the apex of the opening.

11. A rubber article according to claim 10 wherein the openings have a paraboloidal configuration.

12. A rubber article according to claim 10 wherein the openings have a semi-ellipsoidal configuration.

13. A molded, foamed rubber article having a plurality of shaped openings therein extending from the base thereof transversely of the longitudinal axis and terminating short of the surface thereof, said openings being formed essentially in configuration to a spheroidal segment for the major extent of their depth to provide a surrounding wall surface in the foamed rubber that is progressively curved from the apex of said openings toward the base over a major area of said wall surface.

JOSEPH ANTON TALALAY.

REFERENCES CITED

The following references are of record in the file of this patent:

UNITED STATES PATENTS

| Number | Name | Date |
| --- | --- | --- |
| 233,898 | Villiers | Nov. 2, 1880 |
| 264,730 | McCrodden | Sept. 19, 1882 |
| 1,522,969 | Morand | Jan. 13, 1925 |
| 2,283,116 | Young | May 12, 1942 |
| 2,321,340 | Waterbury | June 8, 1943 |
| 2,340,278 | Sudman | Jan. 25, 1944 |
| 2,341,499 | Cunningham | Feb. 8, 1944 |
| 2,351,529 | Luxenberger et al. | June 13, 1944 |
| 2,364,036 | MacKay et al. | Nov. 28, 1944 |

FOREIGN PATENTS

| Number | Country | Date |
| --- | --- | --- |
| 113,707 | Australia | Aug. 19, 1941 |